United States Patent
Ozawa (10) Patent No.: US 6,430,378 B1
(45) Date of Patent: Aug. 6, 2002

(54) IMAGE FORMING APPARATUS WITH LAMP BURN-OUT DETECTION

(75) Inventor: Kazuyuki Ozawa, Yokohama (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/773,514

(22) Filed: Feb. 2, 2001

(51) Int. Cl.[7] ............................................. G03G 15/04
(52) U.S. Cl. ...................................... 399/32; 358/406
(58) Field of Search .................. 399/32, 220; 356/406, 356/461

(56) References Cited

U.S. PATENT DOCUMENTS 5,732,308 A   3/1998  Miura ......................... 399/32
5,978,614 A * 11/1999  Takeuchi ..................... 399/32

FOREIGN PATENT DOCUMENTS

| JP | 6-102723  | * | 4/1994  |
| JP | 8-265521  | * | 10/1996 |
| JP | 9-26690   | * | 1/1997  |
| JP | 10-93783  | * | 4/1998  |

* cited by examiner

Primary Examiner—Joan Pendegrass
(74) Attorney, Agent, or Firm—Foley & Lardner (57) ABSTRACT

It is decided whether or not a light exposure lamp 5 burns out by comparing a light receiving output of a CCD 10 involved when a light exposing position of a light exposure lamp 5 corresponds to a white color reference sheet 13 with an initially set value.

20 Claims, 7 Drawing Sheets

| SCCLK | H.OFF | CW/CCW | DATA 3 | DATA 2 | DATA 1 | DATA 0 | OPERATION |
|---|---|---|---|---|---|---|---|
| H | H | – | – | – | – | – | |
| H | L | * | * | * | * | * | MAGNETIC EXCITATION OFF |
| | | L | * | * | * | * | MAGNETIC EXCITATION ON / NORMAL ROTATION |
| | | H | * | * | * | * | REVERSE ROTATION |
| | | * | H | H | H | H | (250 DIVIDED) 0.00288° |
| | | * | H | H | H | L | (200 DIVIDED) 0.00360° |
| | | * | H | H | L | H | (125 DIVIDED) 0.00576° |
| | | * | H | H | L | L | (100 DIVIDED) 0.00720° |
| | | * | H | L | H | H | (80 DIVIDED) 0.0090° |
| | | * | H | L | H | L | (50 DIVIDED) 0.0144° |
| | | * | H | L | L | H | (40 DIVIDED) 0.0180° |
| | | * | H | L | L | L | (25 DIVIDED) 0.0288° |
| | | * | L | H | H | H | (20 DIVIDED) 0.036° |
| | | * | L | H | H | L | (10 DIVIDED) 0.072° |
| | | * | L | H | L | H | (8 DIVIDED) 0.090°  MAGNETIC EXCITATION SYSTEM D |
| | | * | L | H | L | L | (5 DIVIDED) 0.144° |
| | | * | L | L | H | H | (4 DIVIDED) 0.180° |
| | | * | L | L | H | L | (2.5 DIVIDED) 0.288°  MAGNETIC EXCITATION SYSTEM C |
| | | * | L | L | L | H | (2 DIVIDED) 0.36°  MAGNETIC EXCITATION SYSTEM B |
| | | * | L | L | L | L | (1 DIVIDED) 0.72°  MAGNETIC EXCITATION SYSTEM A |

IMAGE FORMING APPARATUS WITH LAMP BURN-OUT DETECTION

BACKGROUND OF THE INVENTION

In an image forming apparatus such as a copying machine, a light exposing means is reciprocably moved along a document glass by the operation of a scanning motor, the document glass is scanned with light during the forward movement to read out an image of a document, and a read-out image is formed on a copying sheet as an image formation medium. As a scan motor use is made of a pulse motor.

The light exposure means includes, as constituent elements, a light exposure lamp and a carriage with the light exposure light mounted thereon. The carriage is reciprocably moved along the document glass and coupled to a shaft of the scan motor through a power transmission mechanism, such as a belt and wire, and moved in reciprocatory motion upon receipt of a power of the scan motor.

The light exposure lamp has a limited service life and, upon burning-out, cannot read out an image on the document in which case a copying sheet emerges as a solid black image.

During a continuous copying operation performed in a continuous copying mode in particular, there are sometimes the cases where the light exposure lamp will burn out. If, in this case, a printing operation is continued to a last end in spite of the burning-out of the light exposure lamp, a developing agent and copying sheet are consumed in a waste manner.

BRIEF SUMMARY OF THE INVENTION

The present invention is achieved with the above-mentioned situation in mind and it is accordingly the object of the present invention to provide an image forming apparatus and method of controlling the apparatus which, when a light exposure lamp burns out, can immediately detect it and avoid a waste consumption of a developing agent and image formation medium.

An image forming apparatus of the present invention comprises a document glass on which a document is placed, a light exposure lamp for exposing the document glass with light, a color reference member for shading correction which is provided at a non-document-placing area of the document glass, moving means for moving the light exposure lamp along the document glass, image signal outputting means for receiving reflected light from the document glass under the light exposure and movement of the exposure lamp and outputting an image signal corresponding to that light receiving amount, and deciding means for deciding whether or not the light exposure lamp burns out by comparing an output of the image signal outputting means involved when a light exposing position of the light exposure lamp corresponds to the color reference member with an initially set value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

One embodiment of the present invention will be described below with reference to the accompanying drawing.

Figure 1:
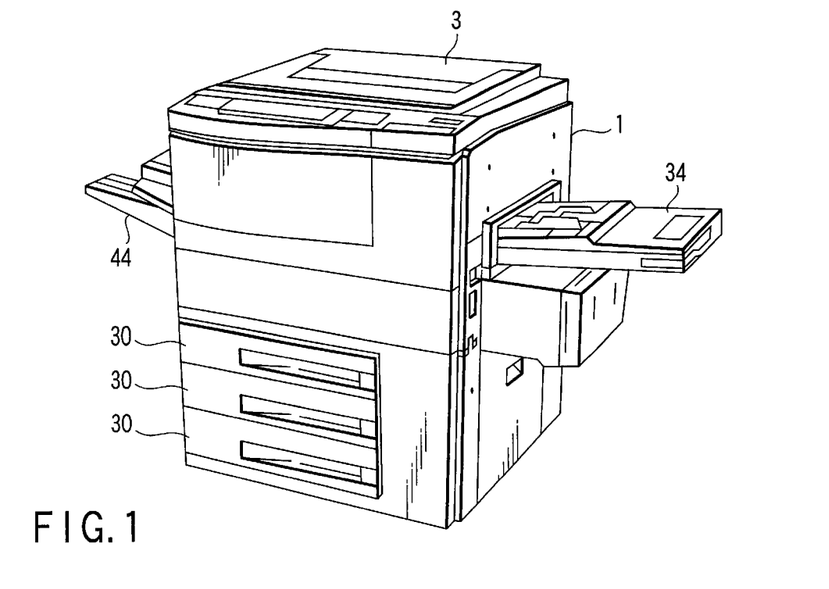
FIG. 1 is a view showing an outer appearance of one embodiment of the present invention.
Figure 2:
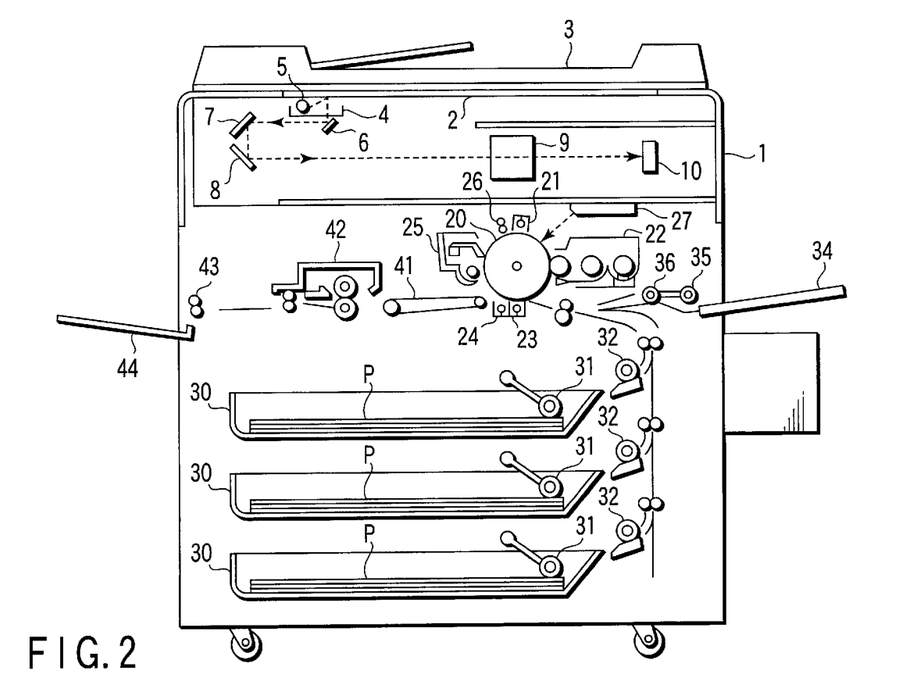
FIG. 2 is a view showing an internal structure according to the embodiment of the present invention.

As shown in FIGS. 1 and 2, a transparent document glass (glass plate) 2 is provided on the upper portion of a body 1 to allow a document to be placed on it. An automatic document feeder (ADF) 3 is provided over the document glass 2 in a way to be freely openable and closable. The automatic document feeder 3 is adapted to automatically feed document sheets one by one to allow the document sheet to be set on the document glass.

Figure 3:
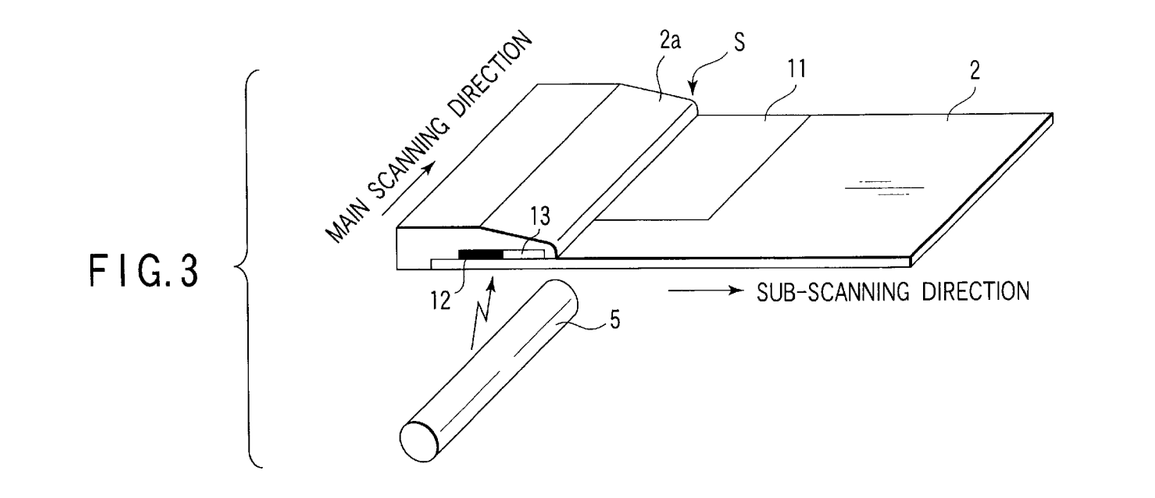
FIG. 3 is a view showing a structure of a document glass and its peripheral portion of the embodiment.

As shown in FIG. 3, an indicator section 2a is provided on one side section of the document glass 2. A stepped section between the indicator section 2a and the document glass 2 provides a reference position S for document setting. The document 11 is set to align with the reference position S. That is, with the document forward-end setting position S as a boundary, the indicator section 2 side (left side as indicated in Figure) provides a non-document placing area and a remaining section (right side as indicated in Figure) a document placing area.

A carriage 4 is provided below a lower surface side of the document glass 2 and has an exposure lamp 5 mounted at the carriage 4. The carriage 4 and light exposure lamp 5 constitute a light exposing means. The carriage 4 can be reciprocably moved along a lower surface of the document glass 2. The carriage 4, while being moved in forward motion from the non-document-placing area toward the document placing area, allows the lower surface side of the indicator section 2a, as well as the document glass 2, to be scanned under the lighting of the light exposure lamp 5.

Through the light exposure scanning, a reflected light image is obtained from the document on the document glass 2. The reflected light image is projected onto an image signal outputting means, such as a charge coupled device 10, through reflection mirrors 8, 7, 8 and lens block for variable power. The CCD 10 has a large number of photoelectric conversion elements and outputs an image signal of a voltage level corresponding to a received light amount. The image signal is amplified and converted to a digital signal. The digital signal, after being properly processed by an image processing section, is supplied to a laser unit 27. The laser unit 27 emits a laser beam in response to an input signal.

The forward movement direction of the light exposure lamp 5 is referred to as a sub-scanning direction and a direction perpendicular to the sub-scanning direction is referred to as a main scanning direction.

A black color reference sheet 12 and white color reference sheet 13 are sequentially arranged beneath the lower surface side of the indicator section 2a, that is, the non-document-placing area, and along the moving direction of the light exposure lamp 5 and provide a color reference member for shading correction. Both the reference sheets have a dimensional shape corresponding to a longitudinal length of the indicator section 2a.

Figure 4:
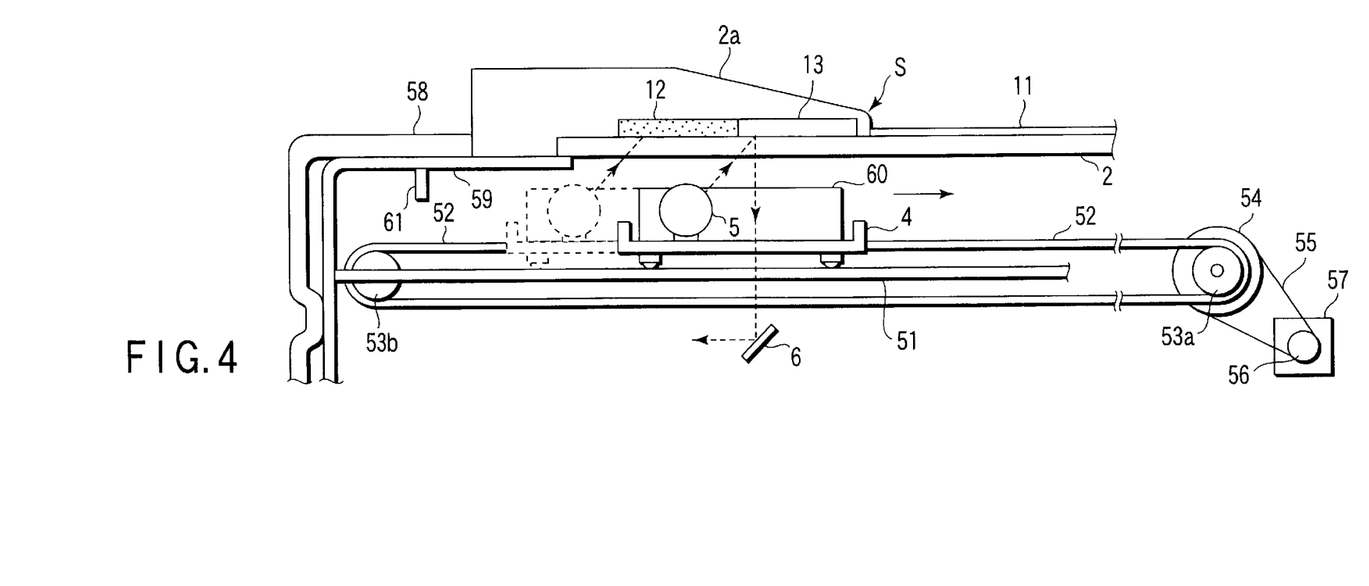
FIG. 4 is a view showing a light exposure lamp and its peripheral portion of the embodiment.

As shown in FIG. 4, the carriage 4 is so set as to be movable on a rail 51. The carriage 4 is coupled to a wire 52. The wire 52 is spanned between a drive pulley 53a and a driven pulley 53b. The drive pulley 53a is coupled to a speed reducing pulley 54. The speed reducing pulley 54 is connected to a pulley 56 of a scan motor 57 through a timing belt 55. As the scan motor 57 use is made of a pulse motor. The moving position of the carriage 4 is controlled by the number of drive voltage pulses (the number of steps) supplied to the scan motor 57.

The outer peripheral surface of the body 1 is formed by a cover 58. A frame 59 is provided inside en the cover 58 to retain the rail 51. The home switch 61 is provided on the frame 59. The home switch 61 has a slit for allowing an intrusion of a light shielding plate 60 which is mounted on the carriage 4. The home switch optically detects whether or not the light shielding plate 60 intrudes into the slit and it is turned ON when the plate 60 intrudes into the slit and is turned OFF when the plate 60 does not intrude into the slit. When the home switch 61 is turned ON, it is decided that the carriage 4 is located in a predetermined home position.

A scanner section for image read-out is constituted by a structure from the document glass to the home switch 61 heretofore explained.

Within a substantially central area of the body 1, a photosensitive drum 20 is so provided as to be rotatable. Around the circumference of the photosensitive drum 20, a charger 21, developing unit 22, transfer unit 23, separator 24, cleaner 25 and discharger 26 are sequentially arranged. The laser beam emitted from the above-mentioned laser unit 27 is directed to the surface of the photosensitive drum 20 through an area between the charger 21 and the developing unit 22.

A plurality of sheet supply cassettes 30 are provided in a bottom zone of the body 1. A plurality of mutually different sizes of many copying sheets are held as an image formation medium in these sheet supply cassettes 30. Copying sheets P are picked up one by one from either one of the respective sheet supply cassettes 30 in accordance with an ON operation of a later-described printing key 83. A pick-up roller 31 is provided for each sheet supply cassette 30 to pick up the sheet. The picked-up sheet P is parted by a parting unit 32 from the sheet supply cassette 30 and sent to a register roller 33. The sheet P is sent to an area between the photosensitive drum 20 and the transfer unit 20 at a considered timing corresponding to the rotation of the photosensitive drum.

The charger 21 applies a high voltage to the photosensitive drum 20 to form an electrostatic charge on the surface of the photosensitive drum 20. By directing a laser beam from the laser unit 27 onto the resultant surface of the photosensitive drum 20, an electrostatic latent image is formed on the surface of the photosensitive drum 20.

The electrostatic latent image on the photosensitive drum 20 is developed by the developing unit 22 with a developing agent (toner) to make it visible. This visible image is transferred by the transfer unit 23 onto the copying sheet P. The sheet P with the visible image formed thereon is separated by the separator 24 from the photosensitive drum 20. The separated sheet P is sent by a belt conveyor 41 to a fixing unit 42. The fixing unit 42 allows an image which is transferred onto the sheet P to be thermally fixed. The image-fixed sheet P is discharged by discharge rollers 43 onto a discharge tray 44.

It is to be noted that, on the surface of the photosensitive drum 20 where the sheet P is separated, the developing agent and charge remain. The remaining developing agent is eliminated by the cleaner 25 and the remaining charge is eliminated by the discharger 28.

By the structure from the photosensitive drum 20 to the discharge tray 44 as heretofore explained, a printer section is provided to allow an image which is read out by the scanner section to be printed on the sheet.

Figure 5:
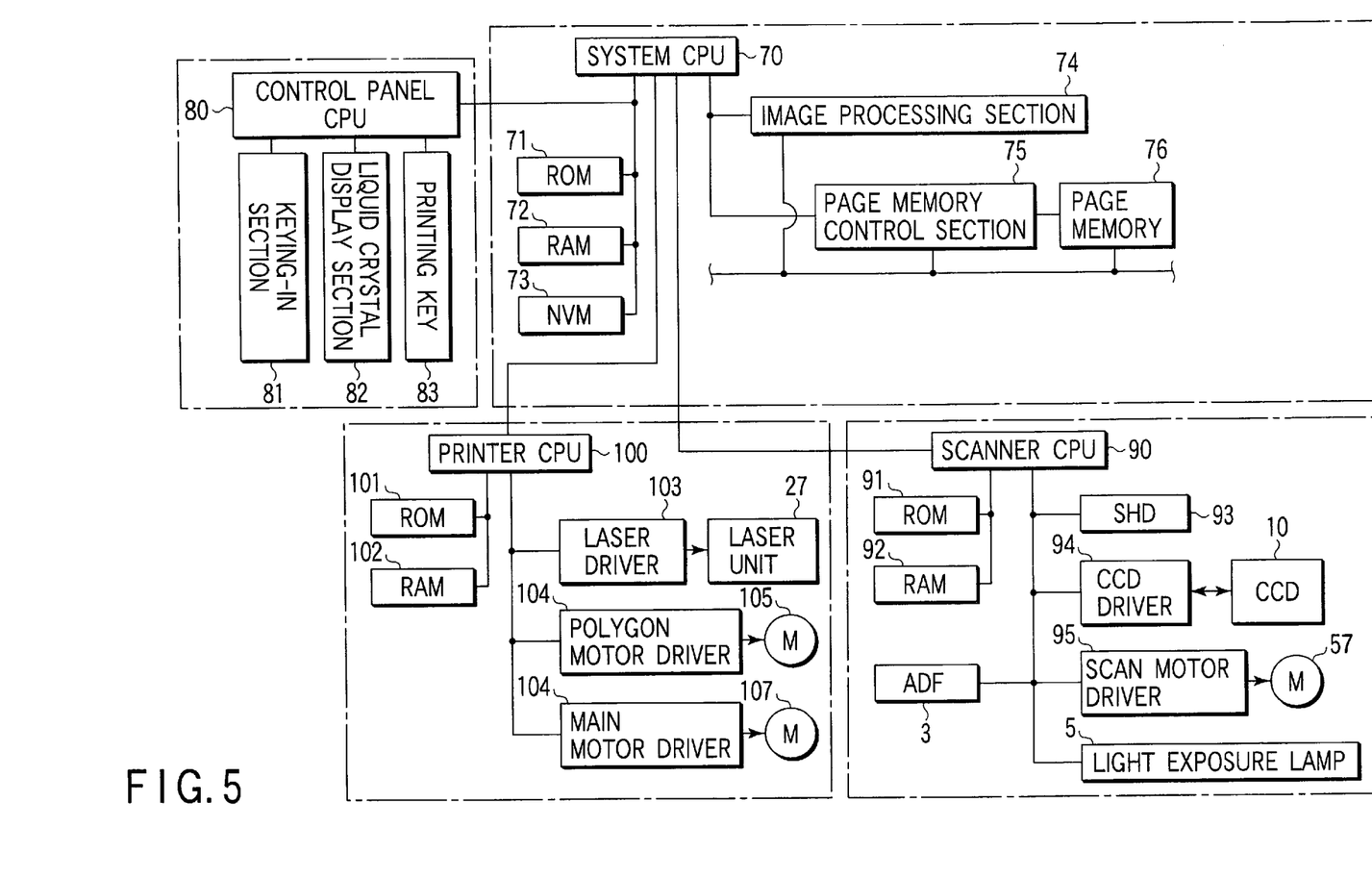
FIG. 5 is a block diagram showing a control circuit of the embodiment.

A whole control circuit is shown in FIG. 5.

A system CPU 70, control panel CPU 80, scanner CPU 90 and printer CPU 100 are connected to each other. The system CPU 70 coordinately controls the control panel CPU 80, scanner CPU 90 and printer CPU 100.

To the system CPU 70, a ROM 71 for control program storage, RAM 72 for data storage, NVM 73, image processing section 74 and page memory control section 75 are connected. To the page memory control section 75 a page memory 76 is connected to store image data page by page.

To the control panel CPU 80 a keying-in section 81, liquid crystal display section 82 and printing key 83 1are connected. The keying-in section 81 has a power source switch, document size designation key, magnification designation key, etc. The liquid crystal display section 82 displays information corresponding to the operation of the keying-in section 81 and various kinds of information to be notified to the user.

To the scanner CPU 90, a ROM 91 for control program storage, RAM 92 for data storage, automatic document feeder (ADF) 3, shading correction section (SHD) 93, CCD driver 94, scan motor driver 95, above-mentioned light exposure lamp 5, etc., are connected. The CCD driver 94 drives the above-mentioned CCD 10. The scan motor driver 95 drives the above-mentioned scan motor 57.

To the printer CPU 100, a ROM 101 for control program storage, RAM 102 for data storage, laser driver 103, polygon motor driver 104 and main motor driver 106 are connected. The laser driver 103 drives the above-mentioned laser unit 27. The polygon motor driver 104 drives a polygon motor serving as a drive source for driving a polygon mirror for allowing the photosensitive drum 20 to be scanned with the laser beam. The main motor driver 106 drives the main motor 107 serving as a drive source for driving the photosensitive drum 20, sheet conveying mechanism etc.

The above-mentioned shading correction section 93 has the following means [1] and [2] as the main functions.

[1] A control means which, when the moving position of the carriage 4, that is, the light exposure position of the light exposure lamp 5, corresponds to the black color reference sheet 12 and white color reference sheet 13 in the non-document-placing area, retains the light receiving output of the CCD 10 as a shading correction reference value in an internal memory.

[2] A correcting means which, when the moving position of the carriage 4, that is, the light exposure position of the light exposure lamp 5, corresponds to the document placing area, corrects the light receiving output of the CCD 10 by the retained reference value to provide a read-out signal.

And the system CPU 70 and scanner CPU 90 have the following means [11] to [13] as main functions.

[11] A detecting means which, out of a light receiving output of the CCD 10 involved when the light exposure position of the light exposure lamp 5 corresponds to the white color reference sheet 13, reads out those light receiving outputs (image signals) corresponding to one line of the main scanning from the internal memory, calculates an average value of the light receiving outputs, and compares the average value with a set value stored in the ROM 91 to see whether or not the light exposure lamp burns out. Stated in more detail, the light exposure lamp 5 is decided as being normal if the average value is larger than the set value and as burning out if the average value is less than the set value.

[12] A control means for immediately stopping a printing operation when it is decided that the light exposure lamp 5 burns out.

[13] A notifying means which, when a result is obtained to the effect that the exposure light lamp 5 burns out, notifies this effect as a character display or image pattern display to the liquid crystal section 82.

Figure 6:
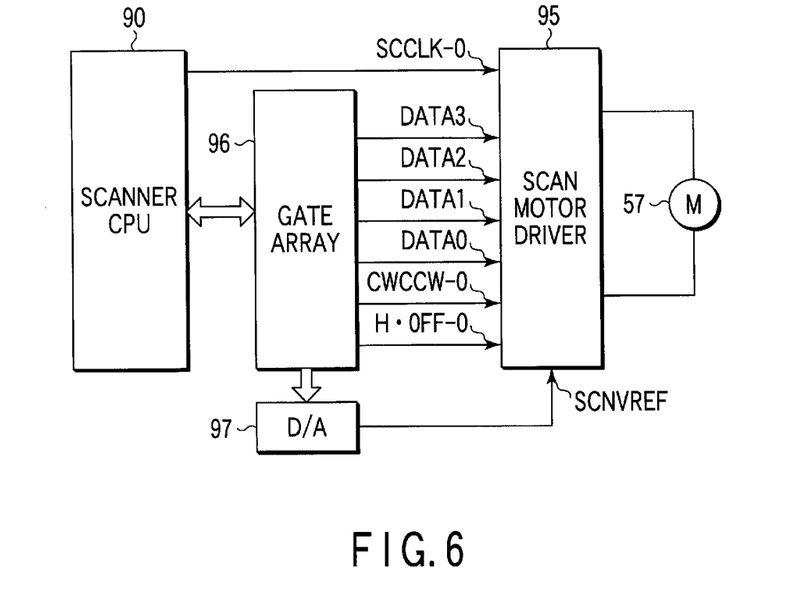
FIG. 6 is a block diagram showing a major section of FIG. 5.

Incidentally, as shown in FIG. 6, a gate array 96 and D/A converter 97 are provided between the scanner CPU 90 and the scan motor driver 95.

In response to instruction data from the scanner CPU 90, the gate array 96 outputs a control signal H•OFF•1 for designating a magnetic excitation ON or magnetic excitation OFF of the scan motor 57, a control signal CWCCW for designating a normal rotation operation or reverse rotation operation of the scan motor 57 and data signals DATA0, DATA1, DATA2, DATA3 for designating a magnetic excitation system of the motor 57. These signals are supplied to a scan motor driver 95. The D/A converter 97 converts current value designation data which is issued from the scanner CPU 90 to a voltage signal SCNVREFA for phase current value designation to the scan motor 57. This voltage signal SCNVREFA is supplied to the scan motor driver 95.

Further, a reference clock signal SCCLK•0 is supplied from the scanner CPU 90 to the scan motor driver 95. The scan motor driver 95 outputs a drive voltage pulse synchronized with a leading edge of a reference clock signal SCCLK•0. This drive voltage pulse is supplied to the scan motor 57. The scanner CPU 90 varies the interval of the reference clock signal SCCLK•0 in response to a magnification set by the keying-in section 81. In accordance with this variation, the interval of the drive voltage pulse supplied to the scan motor 57 varies to change the rotation speed of the scan motor 57, that is, the moving speed of the carriage 4.

Figure 7:
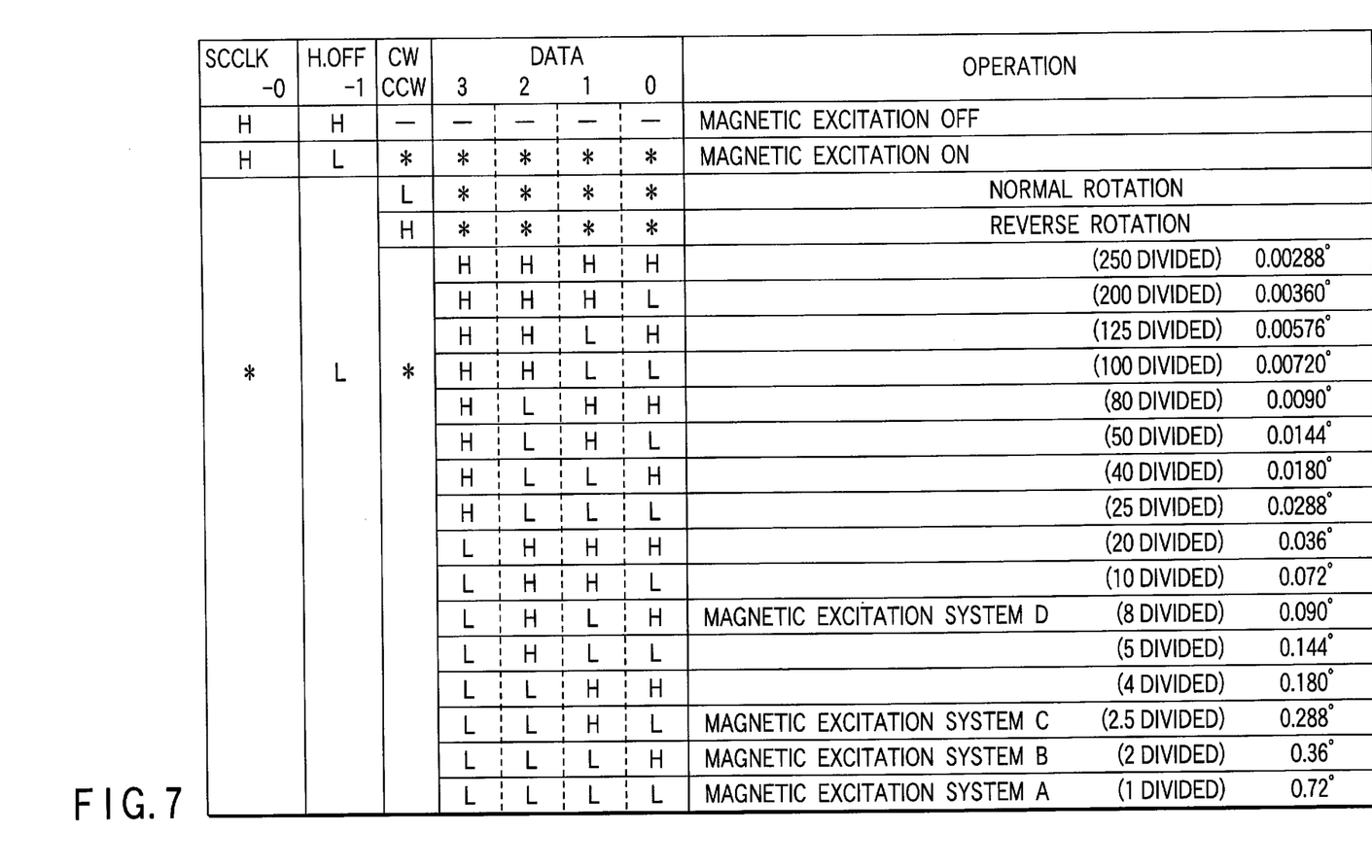
FIG. 7 is a view showing a select condition of magnetic excitation systems of a scan motor of the embodiment.

FIG. 7 shows a select condition under which, in response to the above-mentioned 4-bit data signals DATA0, DATA1, DATA2, DATA3, any given magnetic excitation system is selected in the case where a 5-phse pulse motor is used as the scan motor 57. In the present embodiment, any of the magnetic excitation systems A, B, C and D is selected.

Figure 8:
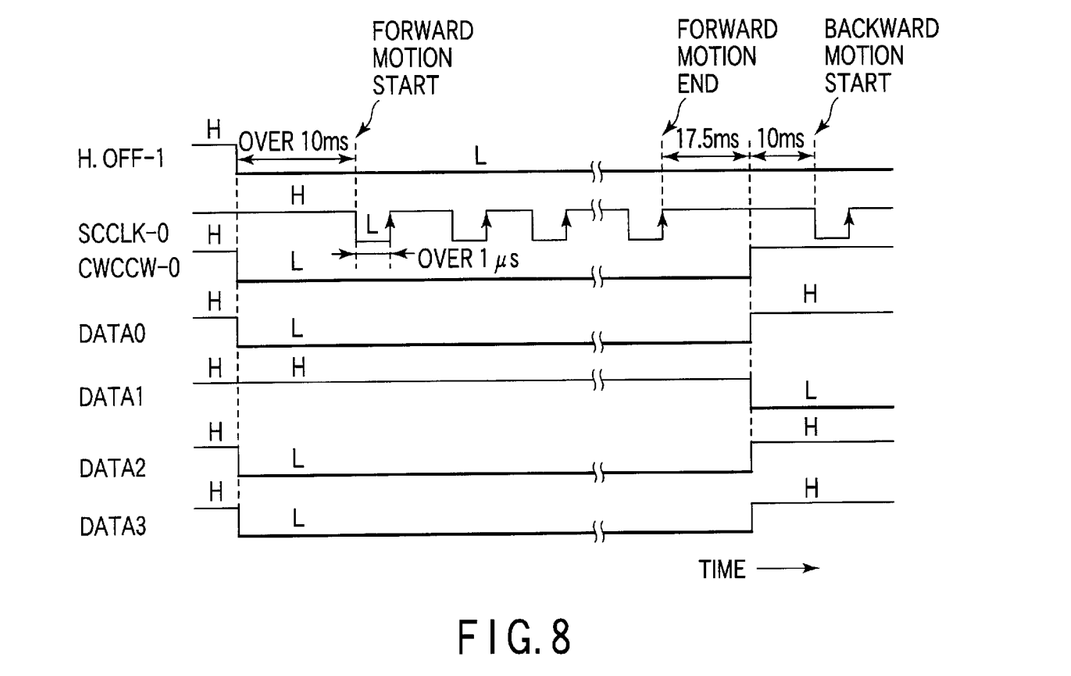
FIG. 8 is a view showing a pattern of each kind of signal relative to the scan motor of the embodiment.

FIG. 8 shows a practical pattern of each signal relating to the driving of the scan motor 57. In this example, the magnetic excitation system C is selected.

At the time of the forward movement of the carriage 4, the scan motor 57 first performs an acceleration operation toward a target speed, then a uniform speed at a position in which the target speed is reached, and finally a deceleration operation. During a period in which the scan motor 57 operates at the uniform speed, an image on the document 11 is read out. Even at a time of a return movement of the carrier 4, the scan motor 57 first performs an acceleration operation, then a uniform speed operation and finally a deceleration operation. The switching of the acceleration operation, uniform-speed operation and deceleration operation is achieved by varying the interval of the reference clock signal SCCLK-0.

Now the operation will be explained below.

Figure 9:
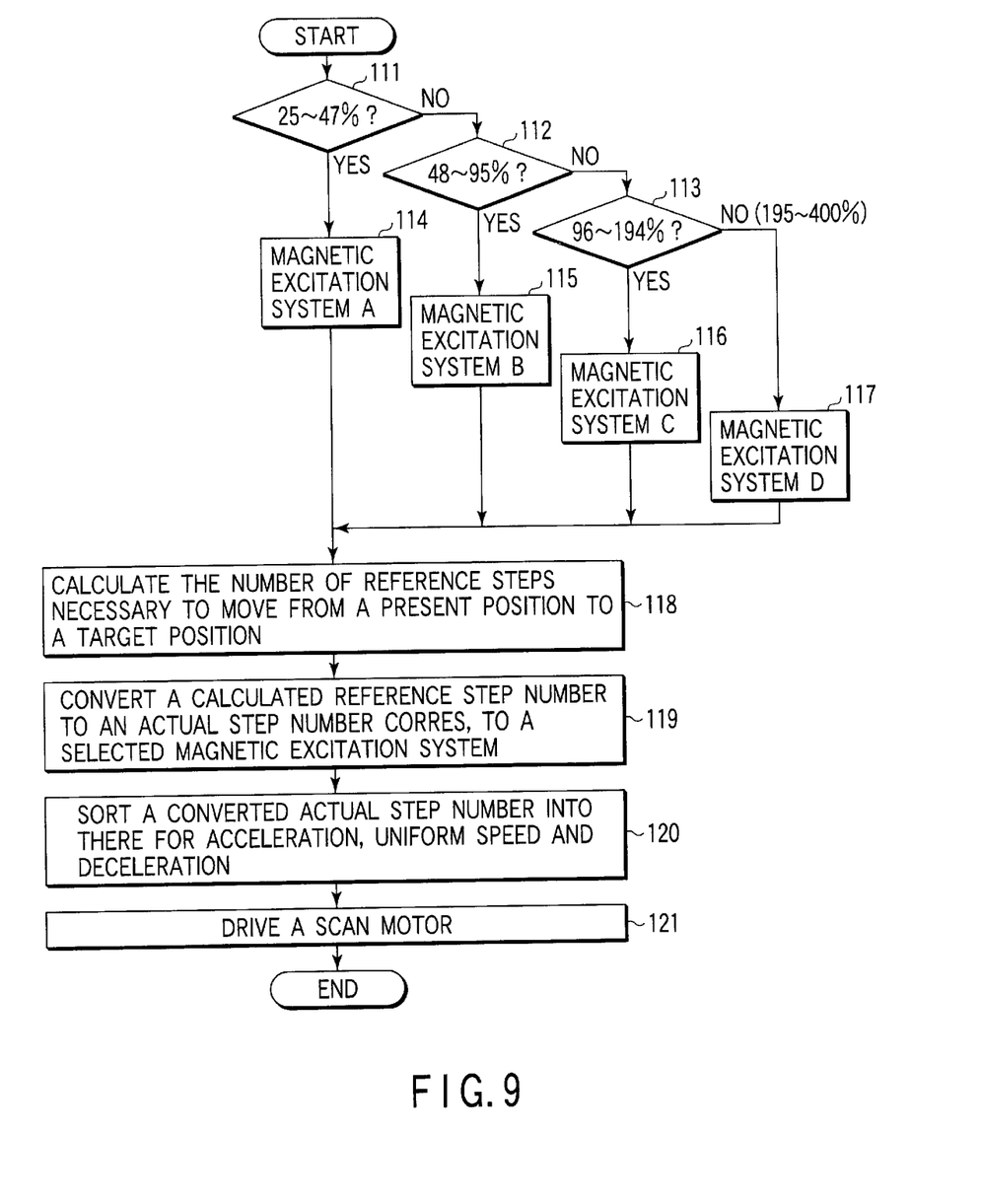
FIG. 9 is a flow chart for explaining the drive control of the scan motor of the embodiment.

The drive control of the scan motor 57 will be described below with reference to the follow chart of FIG. 9.

It is decided that the copying magnification designated at the keying-in section 81 is any of [25 to 47%], [48 to 95%], [96 to 194%] and [195 to 400%](steps 111, 112, 113). In the case where the copying magnification is [25 to 47%] (YES of step 101), the magnetic excitation system A is selected (step 114). In the case where the copying magnification is [48 to 95%] (NO of step 111, YES of step 112), the magnetic excitation system B is selected (step 115). In the case where the copying magnification is [96 to 194%] (NO of step 111, NO of step 112 and YES of step 113), the magnetic excitation system C is selected (step 116). In the case where the copying magnification is [195 to 400%] (NO of step 111, NO of step 112 and NO of step 113), the magnetic excitation system D is selected (step 117).

As shown under the select condition of FIG. 7, in the case of the magnetic excitation system A, a rotation angle corresponding to one step of the scan motor 57 is set to [0.72°]. In the case of the magnetic excitation system B, a rotation angle corresponding to one step of the scan motor 57 is set to [0.36°]. In the case of the magnetic excitation system C, a rotation angle corresponding to one step of the scan motor 57 is set to [0.288°]. In the case of the magnetic excitation system D, a rotation angle corresponding to one step of the scan motor 57 is set to [0.09°]. That is, as the copying magnification is greater, the rotation angle corresponding to one step of the scan motor 57 is set smaller and the moving speed of the carriage 4 becomes slower.

The number of reference steps necessary for the carriage 4 from a present position to the target position is calculated (step 118). The number of reference steps calculated is converted to the number of actual steps corresponding to the selected magnetic excitation system (step 119). The number of actual steps is sorted into those for the acceleration operation, uniform speed operation and deceleration operation (step 120). The scan motor 57 is driven based on the numbers of sorted actual steps (step 121).

Figure 10:
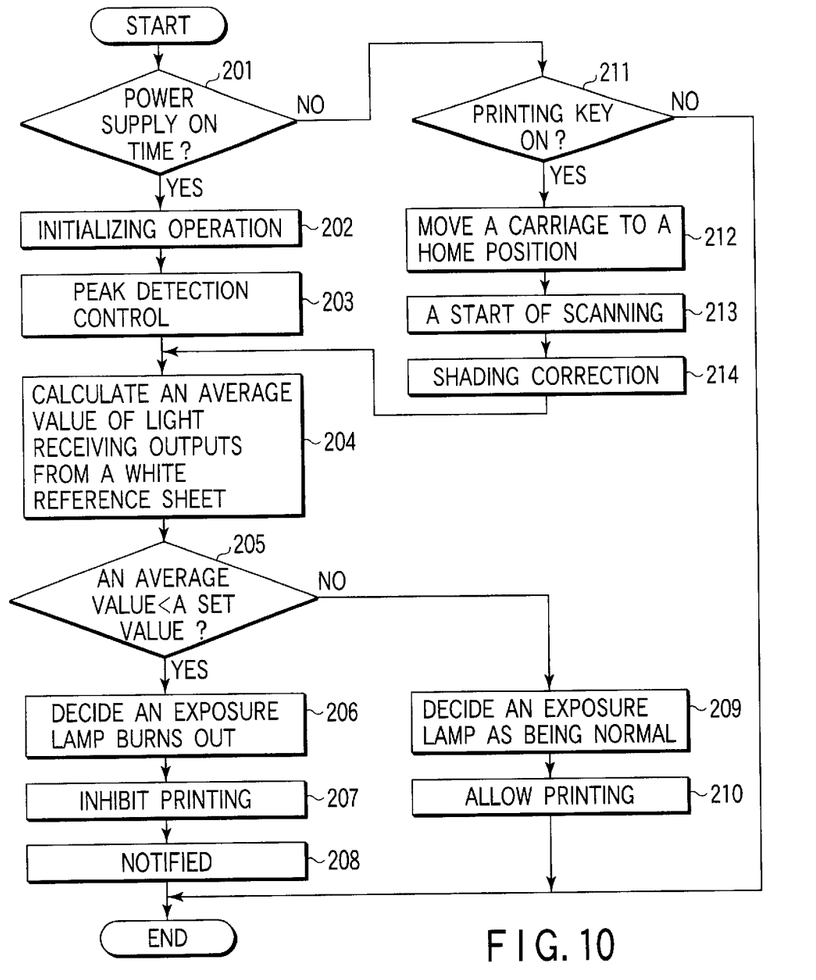
FIG. 10 is a flow chart for explaining the detection of the burning-out of the light exposure lamp.

The control as to decide whether or not the light exposure lamp 5 burns out will be explained below with reference to the flow chart of FIG. 10.

When the power source of the body 1 is turned ON (YES of step 201), an initializing operation is performed (step 202). The initializing operation is so performed as to accurately set a physical position of the carriage 4 relative to a one-step-unit coordinate (hereinafter referred to as a management coordinate) by which the moving position of the carriage 4 is controlled.

After the initializing operation has been completed, a peak detection control is performed (step 203). Since, in general, the voltage of the image signal outputted from the CCD 10 is very small, it is amplified by an amplifier. The amplified image signal is converted by the A/D converter to a digital signal to provide image data. It is to be noted that, in the A/D converter, there is an allowable voltage range relative to the input voltage and, if the voltage of the image signal is outside the allowable voltage range, any proper image data fails to be obtained. In order to prevent such inconvenience, it is necessary to adjust the amplification degree of the amplifier to a proper value and this adjustment is performed by the peak detection control.

Under the peak detection control, the carriage 4 is moved to a position corresponding to the white color reference sheet 13 and the light exposure lamp is turned ON. In a state in which the light of the light exposure lamp 5 is given onto the white color reference sheet 13, the light receiving output of the CCD 10 is retained, for example, in RAM 92. Out of the light receiving output thus retained, a peak value is detected and, based on a result of this detection, the amplification degree of the above-mentioned amplifier is adjusted to a proper value.

Out of the light receiving output retained in the RAM 92 under the peak detection control, those light receiving outputs (image signals) corresponding to one line of the main scanning are read and an average value of the light receiving values is calculated (step 204). And the calculated average value is compared with a set value initially stored in ROM 91 (step 205).

Figure 11:
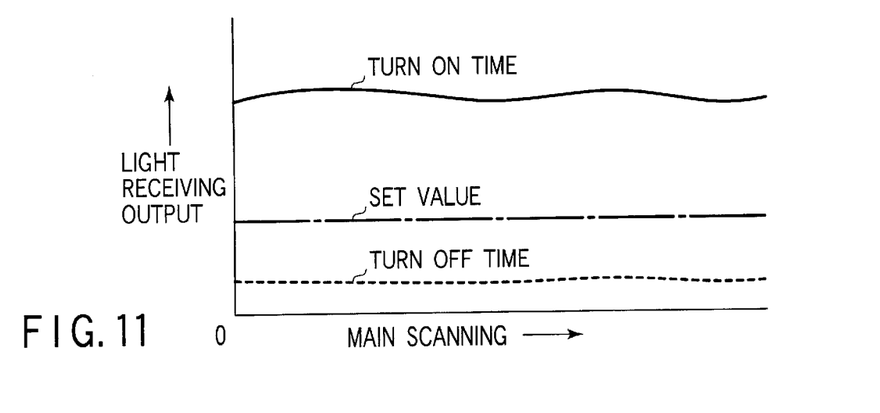
FIG. 11 is a view showing a relation of the light receiving output of a CCD to a set value.

In the case where the light exposure lamp 5 burns out, the light receiving output of the CCD 10 is less than a set value as shown in FIG. 11. In this case (YES of step 205), it is decided that the light exposure lamp 5 burns out (step 206). And a subsequent printing operation is inhibited (step 207) and the burning-out of the light exposure lamp 5 is notified as a character display or image pattern display on the liquid crystal section 82 (step 208). By the inhibiting of the printing operation, a waste consumption of the developing agent and copying sheet is prevented.

In the case where the light exposure lamp 5 is normally lighted, the light receiving output of the CCD 10 becomes larger than the set value. In this case (NO of step 205), it is decided that the light exposure lamp 5 is normal (step 209) and a subsequent printing operation is allowed (step 210).

When the printing key 83 is rendered ON (YES of step 211) with the power source already in an ON state (NO of step 201), the carriage 4 is moved to a home position (step 212). By the lighting of the exposure lamp 5 and forward movement of the carriage 4, scanning is started (step 213) and, when the light exposure position of the light exposure lamp 5 corresponds to the black color reference sheet and white color reference sheet 13, the shading correction is performed (step 214). That is, the light receiving output (black color signal level and white color signal level) of the CCD 10 is retained as a reference value in the internal memory of the shading correction section 93.

When the light exposure position of the exposure lamp 5 corresponds to the document placing area of the document glass 2, the light receiving output of the CCD 10 is corrected by the above-mentioned retained reference value to provide a read-out signal.

By reading out the black and white color reference sheets and, by doing so, initially setting the references of the upper and lower values of the image data, image data obtained by reading out the actual document 11 can be represented as a ratio of the black and while colors. This is a shading correction and it is possible to obtain a stable read-out signal without considering an uneven light amount of the light exposure lamp 5, lens accuracy, output error levels of respective elements of the CCD 10, etc. This provides a better finished image formation.

Out of the light receiving output retained in the internal memory of the shading correction section 93 at the shading correction, those light receiving outputs (image signals) corresponding to one line of the main scanning are read and an average value of the light receiving outputs is calculated (step 204). And the calculated average value is compared with a set value initially stored in the ROM 91 (step 205).

In the case where the light exposure lamp burns out, the light receiving output of the CCD 10 becomes less than the set value as shown in FIG. 11. In this case (YES of step 205), it is decided that the light exposure lamp 5 burns out (step 206). And a subsequent printing operation is inhibited (step 207) and the burning-out of the light exposure lamp 5 is notified as a character display or image pattern display on the liquid crystal display section 82 (step 208).

In the case where the light exposure lamp 5 is normally lighted, the light receiving output of the CCD 10 becomes larger than the set value. In this case (NO of step 205), it is decided that the light exposure lamp 5 is normal (step 209) and a subsequent printing operation is allowed (step 210).

In a continuous copying for continuously performing the copying of many sheets, the operation of the carriage 4 and scanning of the light exposure lamp 5 are performed for each copying. And the shading correction is performed for each scanning and it is decided whether or not the light exposure lamp 5 burns out for each performance of the shading correction.

In the case where, as set out above, the light exposure lamp 5 burns out during a continuous copying operation, the printing operation is immediately inhibited, thus preventing a waste consumption of the developing agent and copying sheet P. Further, since the present apparatus detects the burning-out of the light exposure lamp through the utilization of the white color reference sheet 13 for shading correction, no special component parts for detection is necessary and it is possible to avoid a rise in cost.

Although, in the above-mentioned embodiment, the burning-out of the light exposure lamp has been explained as being detected by calculating an average value of the light receiving outputs corresponding to one line of the main scanning of the CCD 10 and comparing the average value with the set value, it is not necessarily required that the average value be calculated. It may be possible to sequentially compare the light receiving output corresponding to one line of the main scanning of the CCD 10 with the set value and detect the burning-out of the light exposure lamp in accordance with a result of comparison.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
    a document glass on which a document is placed;
    a light exposure lamp for exposing the document glass with light;
    a color reference member for shading correction which is provided at a non-document-placing area of the document glass;

moving means for moving the light exposure lamp along the document glass;

a charge coupled device which receives reflected light from the document glass under the light exposure and movement of the light exposure lamp and outputs an image signal corresponding to that receiving light amount, which is obtained by scanning of lines in the charge coupled device; and deciding means for deciding whether or not the light exposure lamp burns out by comparing an average value of outputs of each of the lines in the charge coupled device which are obtained when a light exposure position of the light exposure lamp corresponds to the color reference member, with an initially set value.

2. An apparatus according to claim 1, wherein the color reference sheet is comprised of a black color reference sheet and white color reference sheet, and the deciding means decides whether or not the light exposure lamp burns out by comprising an average value of outputs of said each line in the charge coupled device which are obtained when the light exposure position of the light exposure lamp corresponds to the white color reference sheet, with the initially set value.

3. An apparatus according to claim 1, further comprising printing means for printing an image corresponding to the image signal outputted from the charge coupled device onto an image formation medium; and control means for inhibiting printing by the printing means when the deciding means decides that the light exposure lamp burns out.

4. An apparatus according to claim 1, further comprising notifying means for, when the deciding means decides that the light exposure lamp burns out, notifying this effect.

5. An image forming apparatus comprising:

a document glass on which a document is placed;

an exposure lamp for exposing the document glass with light;

a color reference member for shading correction which is provided at a non-document-placing area of the document glass;

moving means for moving the light exposure lamp from the non-document-placing area toward a document placing area;

a charge coupled device which receives reflected light from the document glass under the light exposure and movement of the light exposure lamp and outputs an image signal corresponding to that receiving light amount, which is obtained by scanning of lines in the charge coupled device; and control means for retaining, as a reference value for shading correction, an output of the charge coupled device involved when a light exposing position of the light exposure lamp corresponds to the color reference member;

shading correction means for, when a light exposing position of the light exposure lamp corresponds to the document placing area of the document glass, correcting an output of the charge coupled device by a reference value retained by the control means to provide a reading-out signal; and deciding means for deciding whether or not the light exposure lamp burns out by comparing an average value of outputs of each of lines in the charge coupled device which are obtained when the light exposure position of the light exposure lamp corresponds to the color reference member, with an initially set value.

6. An apparatus according to claim 5, wherein the color reference member is comprised of a black color reference sheet and white color reference sheet, and the deciding means decides whether or not the light exposure lamp burns out by comparing the average value of the outputs of said each line in the charged coupled device which are obtained when the light exposure position of the light exposure lamp corresponds to the white color reference sheet, with the initially set value.

7. An apparatus according to claim 5, further comprising printing means for printing an image corresponding to an image signal outputted from the charge coupled device onto an image formation medium; and control means for inhibiting printing by the printing means when the deciding means decides that the light exposure lamp burns out.

8. An apparatus according to claim 5, further comprising notifying means for, when the deciding means decides that the light exposure lamp burns out, notifying this effect.

9. An image forming apparatus comprising:

a document glass on which a document is placed;

a light exposure lamp which exposes the document glass with light;

a color reference member for shading correction which is provided at a non-document-placing area of the document glass;

a charge coupled device which receives reflected light from the document glass under the light exposure and movement of the light exposure lamp to output an image signal corresponding to that receiving light amount, which is obtained by scanning of lines in the charge coupled device; and a processor which detects whether or not the light exposure lamp burns out by comparing an average value of outputs of each of the lines in the charge coupled device which are obtained when a light exposure position of the light exposure lamp corresponds to the color reference member, with an initially set value.

10. An apparatus according to claim 9, wherein the color reference member is comprised of a black color reference sheet and white color reference sheet, and the processor detects whether or not the light exposure lamp burns out by comparing the average value of said each line in the charge coupled device which are obtained when the light exposure position of the light exposure lamp corresponds to the white color reference sheet, with the initially set value.

11. An apparatus according to claim 9, further comprising a printer section which prints an image corresponding to the image signal outputted from the charge coupled device, and wherein the processor inhibits printing by the printer section when the processor detects that the light exposure lamp burns out.

12. An apparatus according to claim 9, further comprising a display section which, when the processor detects that the light exposure lamp burns out, notifies a burning-out of the light exposure lamp.

13. An image forming apparatus comprising:

a document glass an which a document is placed;

an exposure lamp which exposes the document glass with light;

a color reference member for shading correction which is provided at a non-document-placing area of the document glass;

a scan motor which moves the light exposure lamp from the non-document-placing area toward a document placing area;

a charge coupled device which receives reflected light from the document glass under the light exposure and movement of the light exposure lamp to output an image signal corresponding to that receiving light amount, which is obtained by scanning of lines in the charge coupled device;

a memory which stores, as a reference value for shading correction, an output of the charge coupled device involved when a light exposing position of the light exposure lamp corresponds to the color reference member;

a shading correction section which, when a light exposing position of the light exposure lamp corresponds to the document placing area of the document glass, corrects an output of the charge coupled device by a reference value retained by the memory to provide a reading-output signal; and a processor which detects whether or not the light exposure lamp burns out by comparing an average value of outputs of each of the lines in the charge coupled device which are obtained when the light exposure position of the light exposure lamp corresponds to the color reference member, with an initially set value.

14. An apparatus according to claim 13, wherein the color reference member is comprised of a black color reference sheet and white color reference sheet, and the processor detects whether or not the light exposure lamp burns out by comparing an output of the charge coupled device involved when the light exposure position of the light exposure lamp corresponds to the white color reference sheet with an initially set value.

15. An apparatus according to claim 13, further comprising a printer section which prints an image corresponding to an image signal outputted from the charge coupled device onto an image formation medium, and wherein the processor inhibits printing by the printer section when the processor detects that the light exposure lamp burns out.

16. An apparatus according to claim 13, further comprising a display section which, when the processor detects that the light exposure lamp burns out, notifies this effect.

17. A burning-out detecting method of an exposure lamp in an image forming apparatus, comprising:

exposing a document glass and a color reference member for shading correction with a light exposure lamp;

moving the light exposure lamp along the document glass;

receiving reflected light from the document glass and the color reference member under the light exposure and movement of the light exposure lamp;

outputting an image signal corresponding to the receiving light amount, which is obtained by scanning of lines in a charge coupled device;

comparing an average value of outputs of each of the lines in the charge coupled device which are obtained when a light exposure position of the light exposure lamp corresponds to the color reference member, with an initially set value; and detecting whether or not the light exposure lamp burns out in accordance with a result of the comparing the average value with the initially set value.

18. A burning-out detecting method of an exposure lamp according to claim 17, wherein the color reference member is comprised of a black color reference sheet and a white color reference sheet, and the comparing the average value with the initially set value is carried out when the light exposure position of the light exposure lamp corresponds to the white color reference sheet.

19. A burning-out detecting method of an exposure lamp according to claim 17, further comprising:

inhibiting printing by a printer section which prints an image corresponding to the image signal when the light exposure lamp burns out.

20. A burning-out detecting method of an exposure lamp according to claim 17, further comprising:

notifying a burning-out of the light exposure lamp when the light exposure lamp burns out.

* * * * *